(12) United States Patent
Lim

(10) Patent No.: US 7,123,720 B2
(45) Date of Patent: Oct. 17, 2006

(54) KEY SCHEDULER FOR ENCRYPTION APPARATUS USING DATA ENCRYPTION STANDARD ALGORITHM

(75) Inventor: Young-Won Lim, Ichon-shi (KR)

(73) Assignee: Hynix Semiconductor, Inc., Ichon-shi (KR)

( * ) Notice: Subject to any disclaimer, the term of this patent is extended or adjusted under 35 U.S.C. 154(b) by 1093 days.

(21) Appl. No.: 09/879,793

(22) Filed: Jun. 13, 2001

(65) Prior Publication Data
US 2002/0018562 A1 Feb. 14, 2002

(30) Foreign Application Priority Data
Jun. 13, 2000 (KR) ........................................ 2000-32451

(51) Int. Cl.
H04K 1/00 (2006.01)

(52) U.S. Cl. ........................................ 380/265; 380/269
(58) Field of Classification Search .................... 380/37, 380/28, 29, 42, 30, 240, 269, 277, 265; 713/172, 713/200, 201, 168
See application file for complete search history.

(56) References Cited

U.S. PATENT DOCUMENTS

| | | | | |
|---|---|---|---|---|
| 4,947,428 A | * | 8/1990 | Guillou et al. | 380/240 |
| 5,675,653 A | * | 10/1997 | Nelson, Jr. | 380/28 |
| 5,835,599 A | * | 11/1998 | Buer | 380/29 |
| 6,108,421 A | * | 8/2000 | Kurdziel et al. | 380/28 |
| 6,272,221 B1 | * | 8/2001 | Tsunoo | 380/28 |
| 6,278,783 B1 | * | 8/2001 | Kocher et al. | 380/277 |
| 6,304,658 B1 | * | 10/2001 | Kocher et al. | 380/30 |
| 6,357,009 B1 | * | 3/2002 | Giles et al. | 713/200 |
| 6,381,699 B1 | * | 4/2002 | Kocher et al. | 713/172 |
| 6,400,824 B1 | * | 6/2002 | Mansoorian et al. | 380/269 |
| 6,442,525 B1 | * | 8/2002 | Silverbrook et al. | 705/1 |
| 6,816,968 B1 | * | 11/2004 | Walmsley | 713/168 |

FOREIGN PATENT DOCUMENTS

EP 0 403 456 A2 12/1990

* cited by examiner

Primary Examiner—Ly V. Hua
(74) Attorney, Agent, or Firm—Pillsbury Winthrop Shaw Pittman LLP

(57) ABSTRACT

A key scheduler for an encryption apparatus using a DES encryption algorithm is disclosed. The key scheduler includes: a first permutation choice unit for permuting a 56-bit block; a first register for storing left 28 bits among the 56-bit block from the first permutation choice unit in accordance with a clock signal; a second register for storing right 28 bits among the 56-bit block from the first permutation choices unit in accordance with the clock signal; a first and a second shift units for shifting the 28-bit blocks stored in the first and the second registers to the left by a first predetermined number of bits and outputting shifted 28-bit blocks to the first and the second registers respectively; a second permutation choice unit for permuting the 28 bits stored in the first and the second registers, thereby generating a first subkey; a third and a fourth shift units, each for shifting the 28 bits stored in the first and the second registers to left by a second predetermined number of bits; and a third permutation choice unit for permuting the 28 hits stored in the third and the fourth shifters, thereby generating a second subkey.

6 Claims, 15 Drawing Sheets

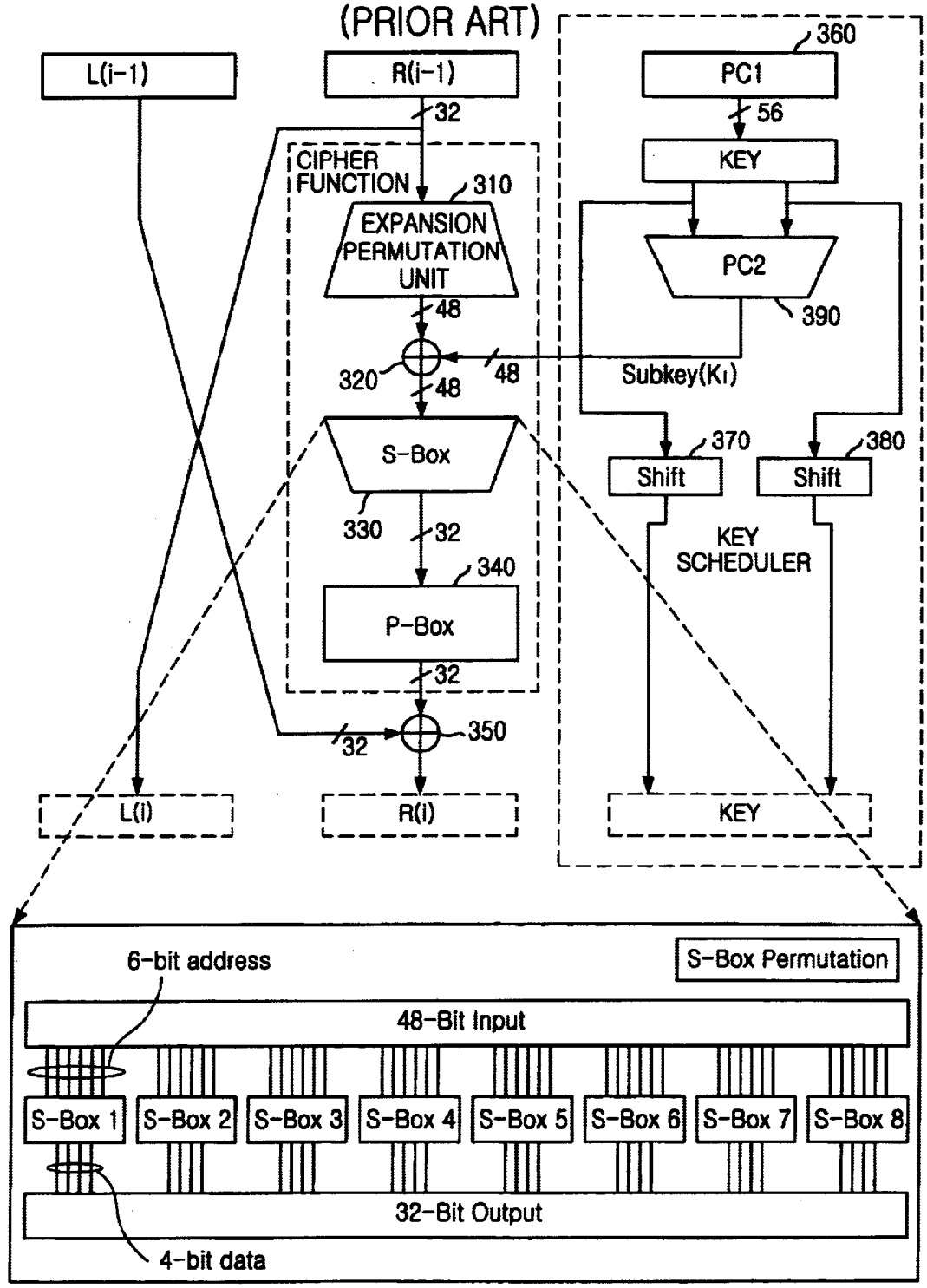

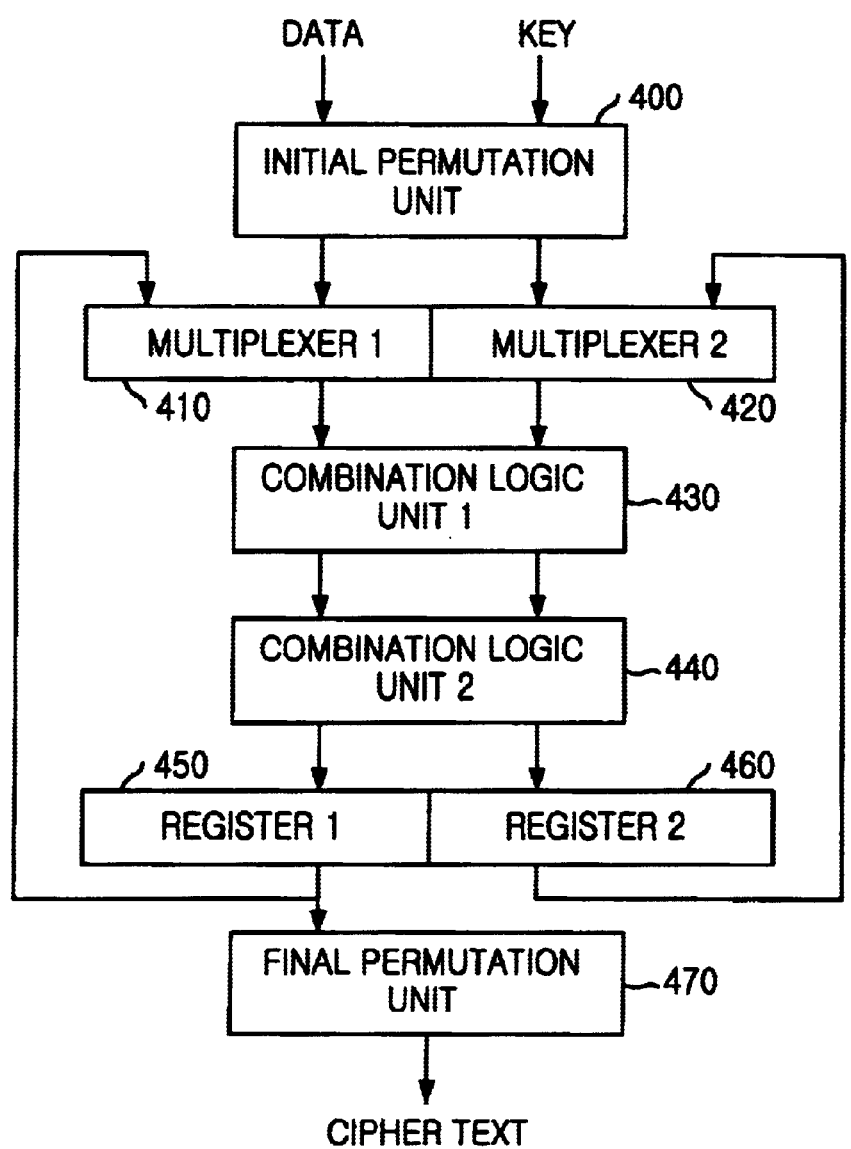

FIG. 14
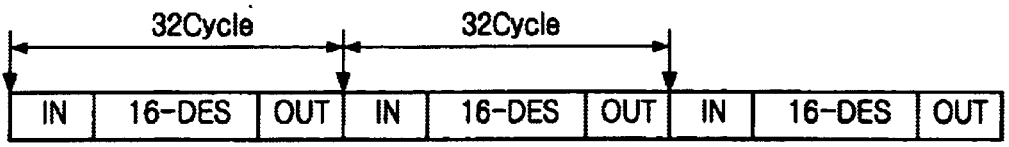
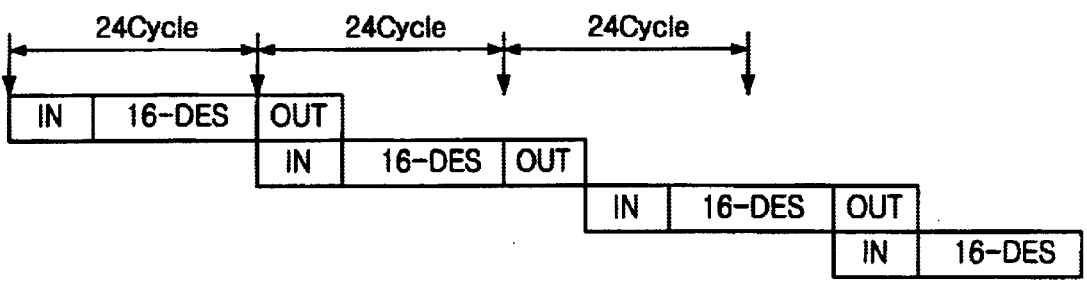
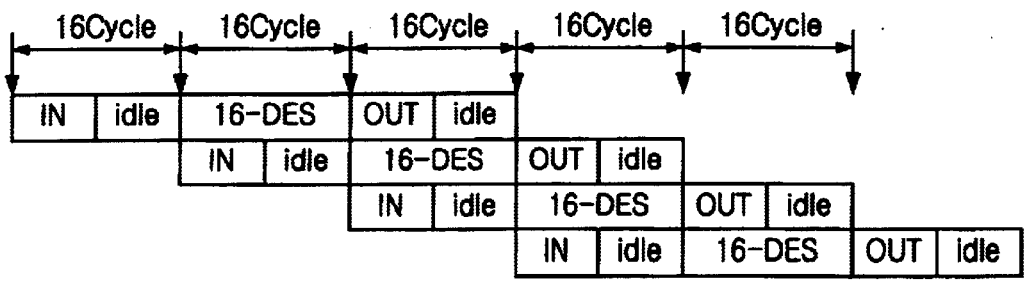
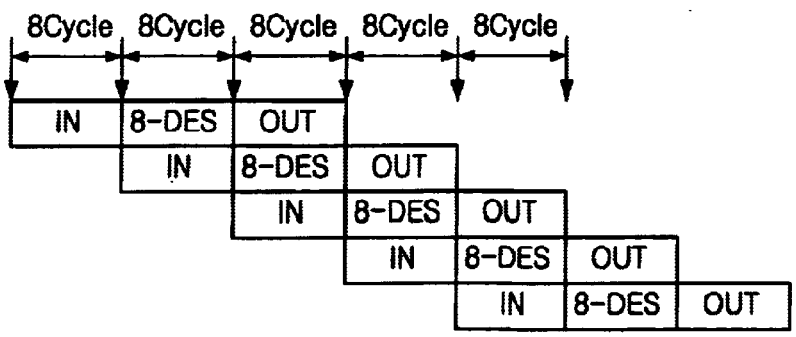

KEY SCHEDULER FOR ENCRYPTION APPARATUS USING DATA ENCRYPTION STANDARD ALGORITHM

FIELD OF THE INVENTION

The present invention relates to a key scheduler for an encryption apparatus; and, more particularly, to a key scheduler for an 8-round encryption apparatus using data encryption standard algorithm.

DESCRIPTION OF THE PRIOR ART

DES (Data Encryption Standard) algorithm has come to the more attention in this environment of the wider usage of networks. Especially, the DES is widely used in Internet security applications, remote access server, cable modem or satellite modem.

The DES is fundamentally a 64-bit block cipher having 64-bit block input and output, 56 bits among the 64-bit key block for encryption and decryption and remaining 8 bits for parity checking. The DES receives a 64-bit plain text block and outputs a 64-bit cipher text generated from the 64-bit plain text block and the 56-bit key.

In a major technique, the DES is implemented by permutation (P-Box), subsitution (S-Box) and key schedule generating a subkey.

Inside of data encryption is implemented in such a way to iteration of 16 round operations and constructed by an initial permutation (IP) of input part and an inverse initial permutation ($IP^{-1}$) of output part.

FIG. 1 is a block diagram of a general DES architecture.

Referring to FIG. 1, the general DES architecture includes an initial permutation unit 110, a DES encryption unit 120 and an inverse initial permutation unit 130.

In the DES encryption unit 120, 64-bit plain text block undergone an IP unit is divided into two blocks, respectively registered at a first left register ($L_0$) and a first right register ($R_0$). At every round, 32-bit data registered at the left register and the right register undergoes a product transformation and a block transformation. The inverse initial permutation unit 130 performs the inverse initial permutation ($IP^{-1}$) of 64-bit data transformed by 16-round operation and outputs a cipher text block.

The basic operation unit 120 includes a plurality of cipher function units 121 and exclusive-OR (X-OR) units 122.

32-bit data registered at the first right register ($L_0$) is encrypted by the cipher function unit f 121 using the sub-key ($K_1$) from a key scheduler and the encrypted 32-bit data is X-ORed with the 32-bit data registered at the first left register ($L_0$) at the X-OR unit 122. 32-bit data from the X-OR unit 122 is registered at a right register ($R_1$) and the 32-bit data registered at the first right register ($R_0$) is swapped and registered at a left register ($L_1$) in a next round, which is referred as 'one round operation'. In DES architecture, 16 round operations are performed by iteration of one round operation.

16-round operation can be expressed as equation (1) and (2).

$$L_i = R_{i-1} \; I=1, 2, \ldots 16 \quad (1)$$

$$R_i = L_{i-1} \oplus f(R_{i-1}, K_i) \; i=1, 2, \ldots 16 \quad (2)$$

FIG. 2 is a block diagram of a conventional key scheduler generating a subkey.

Referring to FIG. 2, the conventional key scheduler includes a first permutation choice (PC1) unit 200, a first and a second shift units 220 and 230, and a second permutation choice (PC2) unit 240.

The first permutation choice (PC1) unit 200 performs permutation of 56-bit key data. The permutated 56 bit key data is divided two 28-bit blocks, and the blocks are registered in registers $C_0$ and $D_0$. Each of the shift units 220 and 230 respectively shifts corresponding 28 bits registered in $C_i$ and $D_i$ (i=0, 1, . . . 15). The shifted key data blocks are registered in a next round registers $C_{i+1}$ and $D_{i+1}$. The second permutation choice (PC2) unit 240 performs permutation of 28-bit blocks registered in the registers $C_i$ and $D_i$ to output a 48-bit subkey $K_i$.

During 16-round operation, the key data blocks of $C_i$ and $D_i$ are shifted by 28-bits, such that the data registered in $C_0$ and $D_0$ are equal to those registered in $C_{16}$ and $D_{16}$.

FIG. 3 is a detailed diagram of a cipher function unit and a S-Box permutation unit of a general DES architecture.

Referring to FIG. 3, the cipher function f includes an expansion permutation unit 310, an exclusive-OR (XOR) unit 320, an S-Box permutation unit 330, a P-Box permutation unit 340 and an XOR unit 350.

The expansion permutation unit 310 performs expansion permutation over 32-bit data ($R_{(i-1)}$) from a right register registering 32-bit text block to output 48-bit data.

The XOR unit 320 performs XOR operation over the 48-bit data from the expansion permutation unit 310 and a subkey ($K_i$) from a key scheduler.

The S-Box permutation unit 330 performs substitution over 48-bit data from the XOR unit 320 to output 32-bit data.

The P-Box permutation unit 340 performs permutation over 32-bit data from the S-Box permutation unit 330.

The XOR unit 350 performs XOR operation over 32-bit data from the P-Box permutation unit 340 and 32-bit data ($L_{(i-1)}$) from a left register.

The key scheduler includes a first permutation choice (PC1) unit 360, two shift units 370 and 380 and a second permutation choice (PC2) unit 380. Each of the shift units 160 and 170 respectively shifts corresponding 28 bits, half of 56-bit key data.

The PC2 unit 390 receives two blocks from the shift units 160 and 170 to compress them to the sub key.

In particular, the S-Box permutation unit 330 includes 8 S-Boxes for receiving 48-bit data and outputting 32-bit data. That is, 48-bit data block is divided into 8 6-bit data, each applied to he corresponding S-Box of the 8 S-Boxes and each of the 8 S-Boxes outputs 4-bit data. Accordingly, 48-bit data is permutated to 32-bit data. The S-Box permutation unit 330 requires a memory, e.g., a programmable logic array (PLA) or a read only memory (ROM), because it employs table look-up technique. Since each of the S-Boxes outputs 4 bits for 6-bit input, it requires 64×4 memory capability and the S-Box permutation unit 130 requires 8×64×4 memory capability. Accordingly, the S-Box permutation unit 330 takes relatively large area in a chip.

For implementing the conventional DES algorithm which iterates the identical operation by 16 times, one round operation is referred as a basic operation unit and the DES architecture is implemented by using 16 basic operation units. However, an unrolled loop architecture which uses one of 2 through 16 round operations as a basic operation unit is introduced and has more attention. The unrolled loop architecture efficiently reduces time margin, slack between the basic operation units by combining the operations of the basic operation units and reduces size of a chip by using a boundary optimizing combination. Since the unrolled loop architecture computes two round operations at one clock cycle, encryption can be, performed within eight clock cycles, however, two S-box permutation units, which take relatively large area in a chip, are necessary.

FIG. 4 is a block diagram of a conventional DES architecture using an unrolled loop cipher function.

Referring to FIG. 4, the conventional DES architecture using an unrolled loop cipher function includes an initial permutation unit 400, multiplexers 410 and 420, combination logic units 430 and 440, registers 450 and 460, and a final permutation unit 470.

The initial permutation unit 400 permutes data and key blocks. The multiplexer 410 selects one of the data block from the initial permutation unit 400 or a data block fed back from the register 450. The multiplexer 420 selects one of the key block from the initial permutation unit 400 or a key block fed back from the register 450. The combination logic unit 430 performs an odd round of encryption operation over the data, block and the key block; from the multiplexers 410 and 420. The combination logic unit 440 performs an even round of encryption operation over the data block and the key block from the combination logic unit 430. The registers 450 and 460 store the data block and the key block from the combination logic unit 440 respectively. The final permutation unit 470 generates a cipher text block from the data block from the register 450.

FIGS. 5A and 5B are block diagrams of the combination logic units of the unrolled loop cipher function unit.

Referring to FIGS. 5A and 5B, the unrolled loop cipher function unit includes the combination logic units of FIG. 4, which are circuits implementing two round operations of the DES algorithm. For a clock cycle, the key scheduler generates two subkeys $K_m$ and $K_n$, and the unrolled loop cipher function unit performs two round operations of the DES algorithm having two cipher function units $f_m$ and $f_n$ and two exclusive-OR (XOR) operation units, by using the keys $K_m$ and $K_n$. In other words, the unrolled loop cipher function unit receives two subkeys $K_m$ and $K_n$ and output data blocks from registers A and B, and outputs operation results $R_C$ and $R_D$ to corresponding to registers at a next clock.

FIG. 6 is a detailed block diagram of the conventional unrolled loop cipher function unit.

Referring to FIG. 6, the unrolled loop cipher function unit includes two cipher function units. The cipher function unit includes an expansion permutation unit 610, an exclusive-OR (X-OR) units 620 and 650, a S-Box permutation unit 630, a P-Box permutation unit 640.

A 32-bit data block from the register $R_B$ is expanded to 48-bit block by the expansion permutation unit 610. The 48bit block is X-ORed with a subkey $K_m$ from the key scheduler by the X-OR unit 620. The 48-bit data block is stored in and substituted into 32-bit data block by the S-Box permutation unit 630. The 32-bit data block from the S-Box permutation unit 630 is permutated by the P-Box permutation unit 640. The 32-bit data block from the P-Box permutation unit 640 is X-ORed with a 32-bit data block from the register $R_A$ by the X-OR unit 650 and the 32-bit data block from the X-OR unit 650 is stored in the register $R_C$. The unrolled loop cipher function unit includes one more cipher function which has the same element as mentioned above and outputs another 32-bit data block to the register $R_D$.

If the 32-bit data blocks $R_{2i-3}$, $R_{2i-2}$ are stored in the registers A and B and two subkeys $K_{2i-1}$, $K_{2i}$ are provided by the key scheduler, 32-bit data blocks $R_{2i-1}$, $R_{2i}$ are computed for one clock cycle by equations (3) and (4).

$$R_{2i-1}=R_{2i-3}\oplus f(R_{2i-2}, K_{2i-1}) i=1, 2, \ldots 8 \quad (3)$$

$$R_{2i}=R_{2i-2}\oplus f(R_{2i-1}, K_{2i}) i=1, 2, \ldots 8 \quad (4)$$

FIG. 7 is a block diagram of a conventional key scheduler having two key scheduling units.

Referring to FIG. 7, the key scheduler includes two key scheduling units each having a first permutation choice unit 700, two registers 710 and 720, shift units 730 and 740, and a second permutation choice unit 750.

In a first key scheduling unit, the first permutation choice unit 700 performs permutation of 56-bit key data block. Each of registers ($C_m$) 710 and ($D_m$) 720 stores 28 bits, half of 56-bit key data block in response to a clock (CLK). The shift units 730 and 740 respectively shifts corresponding the 28-bit key data blocks from the registers by a predetermined number of bits e.g., two, three, or four bits. The second permutation choice unit 750 receives two 28-bit key blocks from the registers ($C_m$) 710 and ($D_m$) 720 and generates a sub-key $K_m$. A second key scheduling unit includes the same elements and generates a sub-key $K_n$.

For eight rounds, the first and the second key scheduling units respectively generate subkeys $K_{2i-1}$ and $K_{2i}$. In other words, the first key scheduling unit shifts the key block by a predetermined number of bits, e.g., one, two, three or four bits for eight clock cycles so that the total number of accumulated shifted bits are 4, 8, 12, 15, 19, 23 and 27. The second key scheduling unit shifts the key block by two, three or four bits for eight clock cycles so that the number of accumulated shifted bits are 2, 6, 10, 14, 17, 21, 25 and 28.

While the key scheduler generating a subkey for one clock cycle of FIG. 2 includes two registers and two shifters, the key scheduler generating two subkeys for one clock cycle as mentioned above needs four registers and four shifters, which takes large area in a chip. Therefore, there is a problem in a large size of the encryption apparatus due to the registers and the shifters.

SUMMARY OF THE INVENTION

Therefore, it is an object of the present invention to provide a key scheduler having a small size.

In accordance with an aspect of the present invention, there is provided a key scheduler for an apparatus using DES encryption algorithm, comprising: a first permutation choice unit for permuting a 56-bit block; a first register for storing left 28 bits among the 56-bit block from the first permutation choice unit in accordance with a clock signal; a second register for storing right 28 bits among the 56-bit block from the first permutation choice unit in accordance with the clock signal; a first and a second shift units for shifting the 28-bit blocks stored in the first and the second registers to the left by a first predetermined number of bits and outputting shifted 28-bit blocks to the first and the second registers respectively; a second permutation choice unit for permuting the 28 bits stored in the first and the second registers, thereby generating a first subkey; a third and a fourth shift units, each for shifting the 28 bits stored in the first and the second registers to left by a second predetermined number of bits; and a third permutation choice unit for permuting the 28 bits stored in the third and the fourth shifters, thereby generating a second subkey.

BRIEF DESCRIPTION OF THE DRAWINGS

The above and other objects and features of the instant invention will become apparent from the following description of preferred embodiments taken in conjunction with the accompanying drawings, in which:

FIG. 3 is a block diagram illustrating a cipher function and a S-Box permutation unit of a general DES architecture;

FIG. 4 is a block diagram of a DES architecture using an unrolled loop ciphers function unit;

FIG. 14 is a timing diagram illustrating effect of the DES architecture using a macro pipeline in accordance with the present invention.

PREFERRED EMBODIMENT OF THE INVENTION

Hereinafter, preferred embodiments of the present invention will be described in detail with reference to the accompanying drawings.

Figure 8:
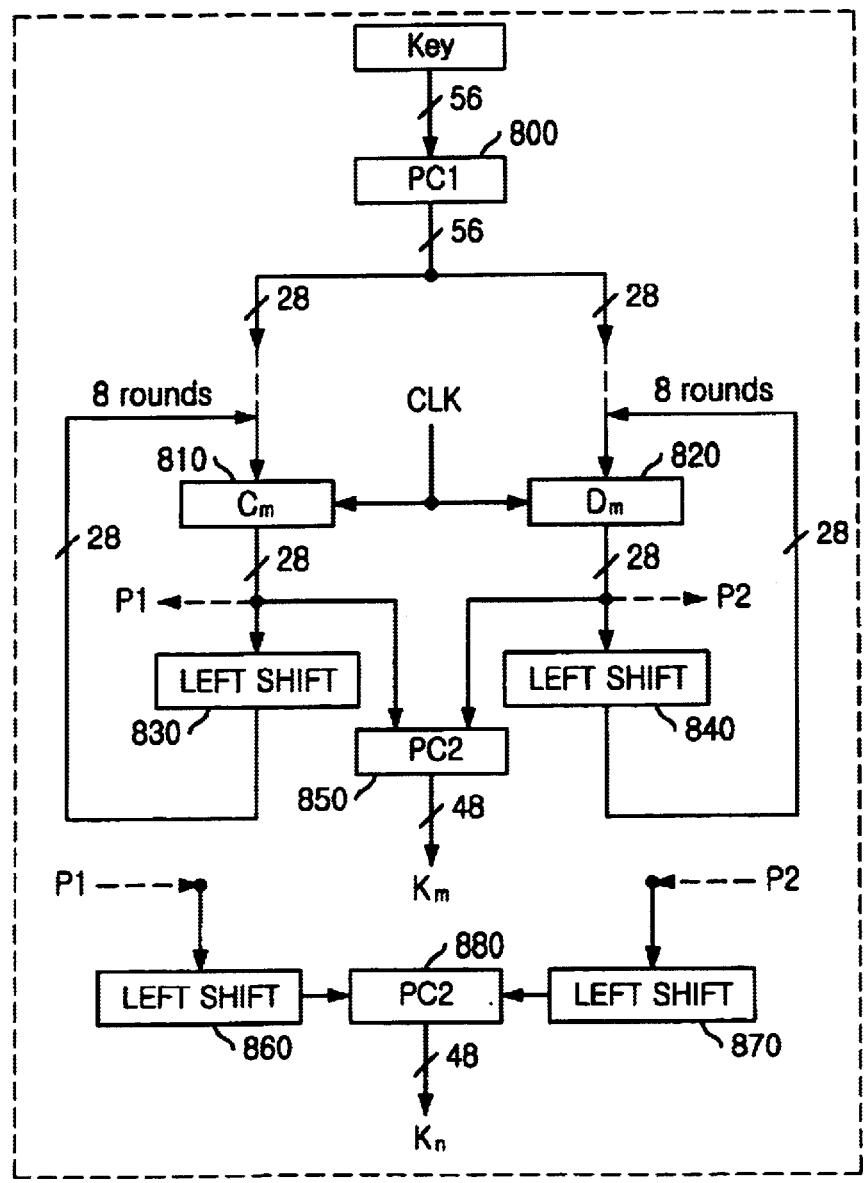
FIG. 8 is a block diagram of a key scheduler in accordance with one embodiment of the present invention.

FIG. 8 is a block diagram of a key scheduler having a key scheduling unit in accordance with one embodiment of the present invention.

Referring to FIG. 8, the key scheduler includes a first permutation choice (PC1) unit 800, two registers 810 and 820, four shift units 830, 840, 860 and 870, and two second permutation choice units (PC2) 850 and 860.

The first permutation choice unit 800 performs permutation of a 56-bit key data block. Each of registers ($C_m$, $D_m$) 810 and 820 store left and right 28 bits, half of 56-bit key data block in response to a clock (CLK) respectively. The shift units 830 and 840 shift corresponding the 28-bit key data from the registers 810 and 820 by a predetermined number of bits e.g., two, three, or four bits. The second permutation choice unit 850 receives two 28-bit key blocks from the registers ($C_m$, $D_m$) 810 and 820 and generates a sub-key $K_m$. The shift units 860 and 870 shift corresponding the 28-bit key data block from the registers 810 and 820 by a predetermined number of bits e.g., one or two bit(s) respectively. The second permutation choice unit 850 receives two 28-bit key blocks from the shift units 860 and 870 and generates a sub-key $K_n$.

For eight rounds, the key scheduler computes a subkey $K_{2i-1}$ in i-th round by using a key scheduling unit. The registers ($C_m$, $D_m$) 810 and 820 receive and store an initial key from the first permutation choice unit 800 or the key block shifted by the shift units 830 and 840 at a next clock cycle. In each round, the shift units shift the key block by a predetermined number of bits $S_m$, e.g., 3, 4, 4, 3, 4, 4, 4, 2(1) bits.

As shown in FIG. 8, a relation between a total number $TS_m$ of shifted bits for obtaining a subkey $K_{2i-1}$ and a total number $TS_n$ of shifted bits for obtaining a subkey $K_{2i}$ in i-th round is expressed as: $TS_n - TS_m = D_m$.

The number of bits shifted in the shift units 830 and 840 at each round is described in tables of FIG. 8.

In the first round ($P_0$), a difference value $D_m$ between $TS_n$ and $TS_m$ is 1. In the eighth round ($P_7$), i.e., when storing a new initial key the difference value $D_m$ is 0, and when plain text blocks are encrypted by using the same key iteratively, the difference value $D_m$ is 1. In the other rounds ($P_1$ to $P_6$), the difference value $D_m$ is 2. Using additional two shifters 860 and 870 and the second permutation choice unit 880 implemented by wiring, the key scheduler computes the subkeys $K_{2i-1}$ and $K_{2i}$ in i-th round and outputs $K_m$ and $K_n$.

Figure 9:
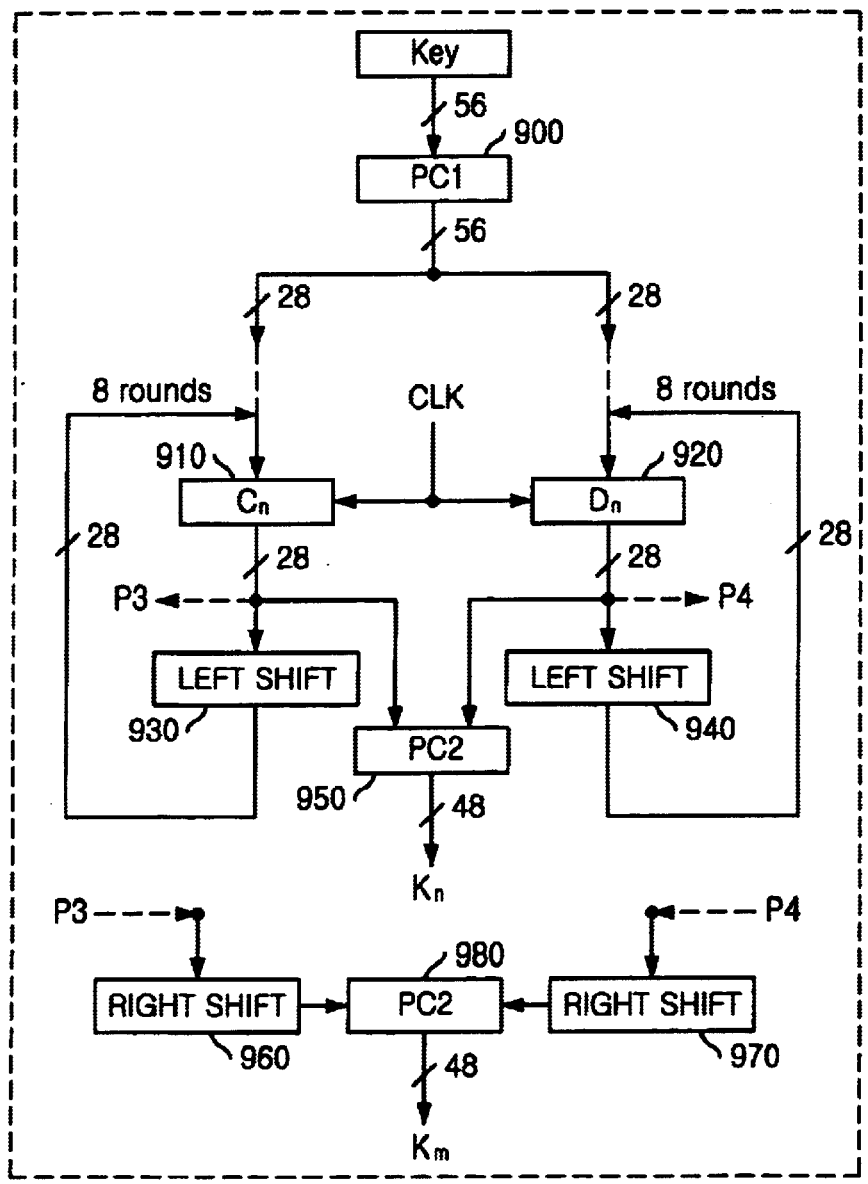
FIG. 9 is a block diagram of a key scheduler in accordance with a another embodiment of the present invention.

FIG. 9 is a block diagram of a key scheduler having a key scheduling unit in accordance with another embodiment of the present invention.

Referring to FIG. 9, the key scheduler includes a first permutation choice (PC1) unit 900, two registers 910 and 920, four shift units 930, 940, 960 and, 970, and two second permutation choice (PC2) unit 950 and 980.

The first permutation choice unit 900 performs permutation of a 56-bit key block. Each of registers ($C_n$, $D_n$) 910 and 920 store 28 bits, half of the 56-bit key block in response to a clock (CLK). Each of the shift units 930 and 940 shifts corresponding the 28-bit key block from the registers 910 and 920 by a predetermined number of bits e.g., two, three, or four bits. The second permutation choice (PC1) unit 950 receives, two 28-bit key blocks from the registers ($C_n$, $D_n$) 910 and 920 and generates a sub-key $K_n$. Each of the shift units 960, 970 shifts corresponding the 28-bit key block from the registers 910 and 920 by a predetermined number of bits e.g., one or two bit(s). The second permutation choice (PC2) unit 950 receives two 28-bit key blocks from the shifters 960 and 970 and generates a subkey $K_m$.

Figure 1:
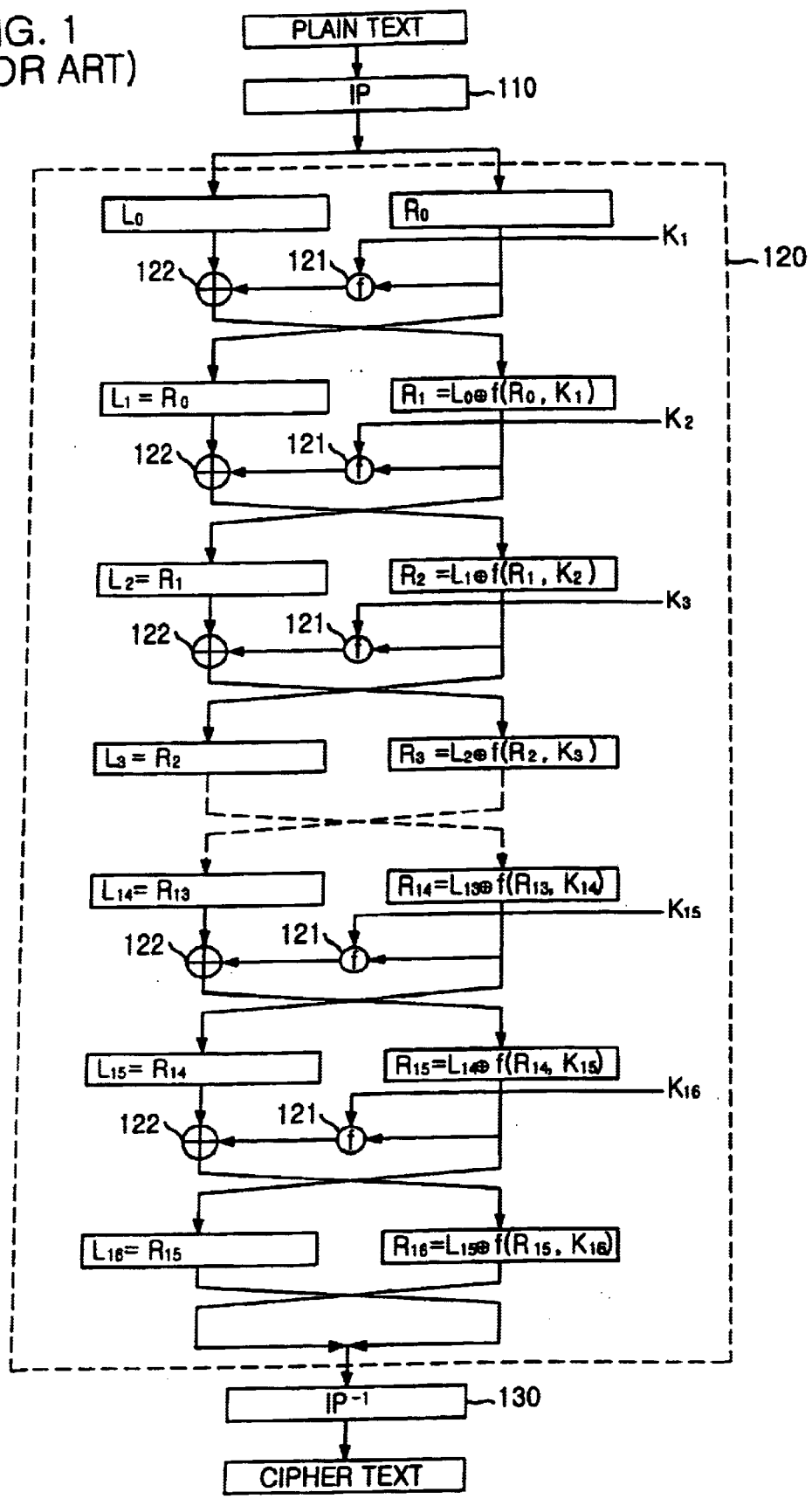
FIG. 1 is a block diagram of a general DES architecture.
Figure 2:
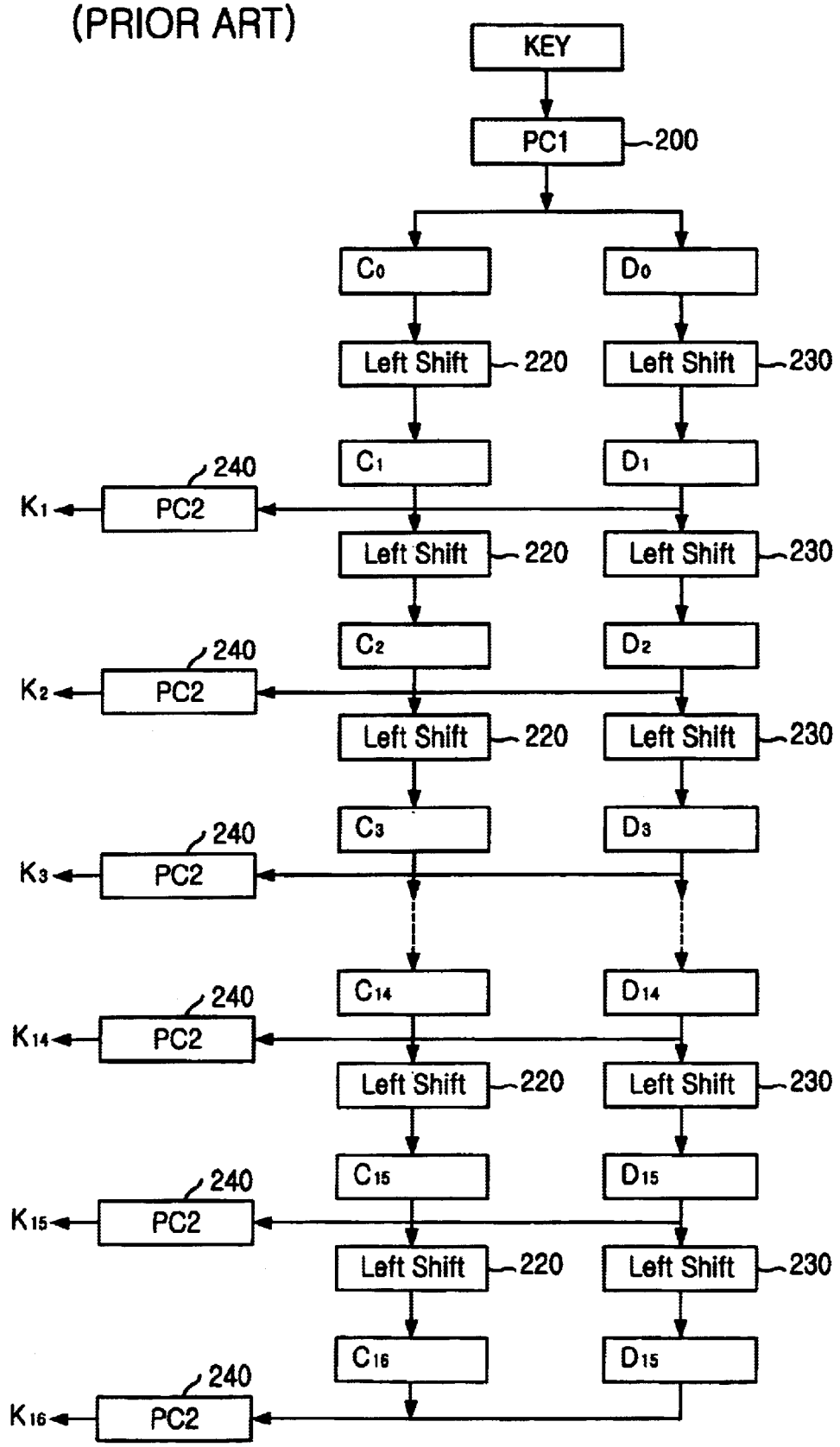
FIG. 2 is a block diagram of a key, scheduler generating a sub-key.
Figure 5A:
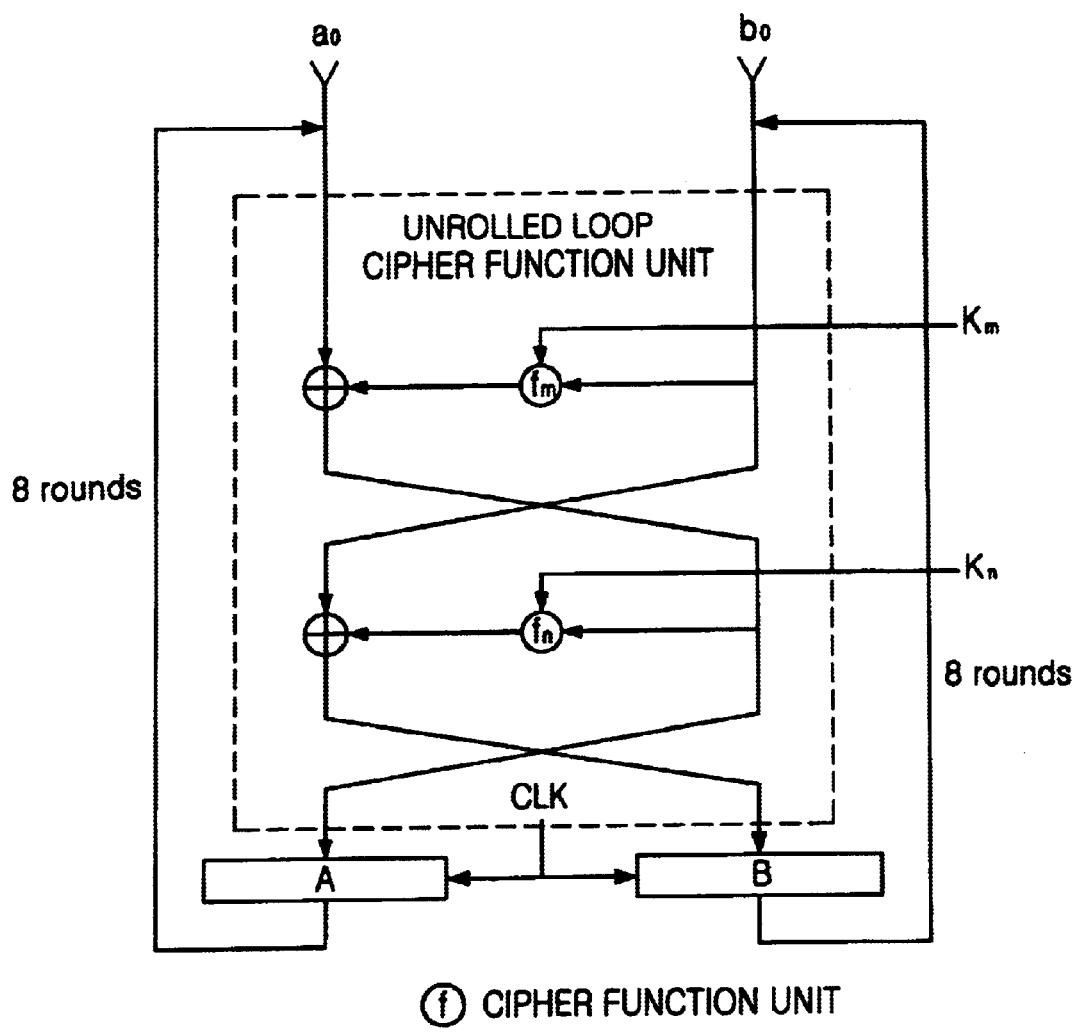
FIGS. 5A and 5B are block diagrams of combination logic units of the unrolled loop cipher function unit.
Figure 5B:
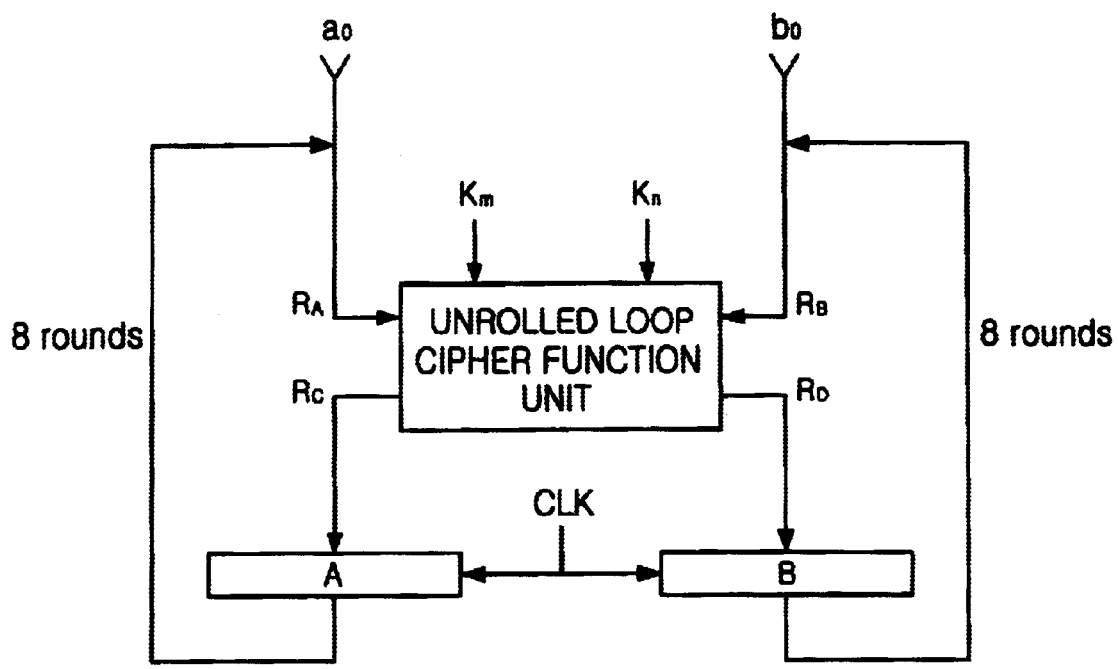
Figure 6:
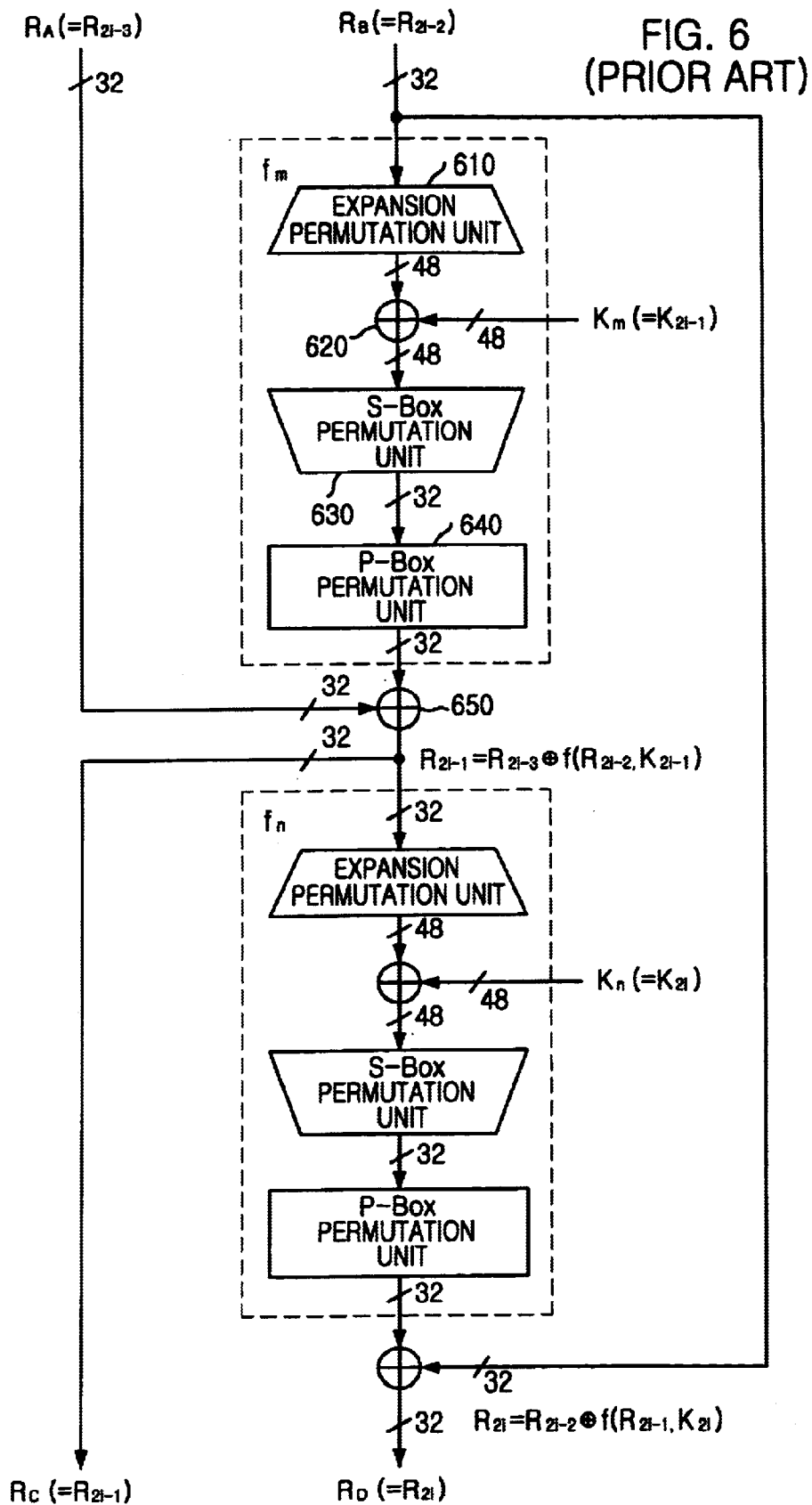
FIG. 6 is a block diagram of the unrolled loop cipher function unit.
Figure 7:
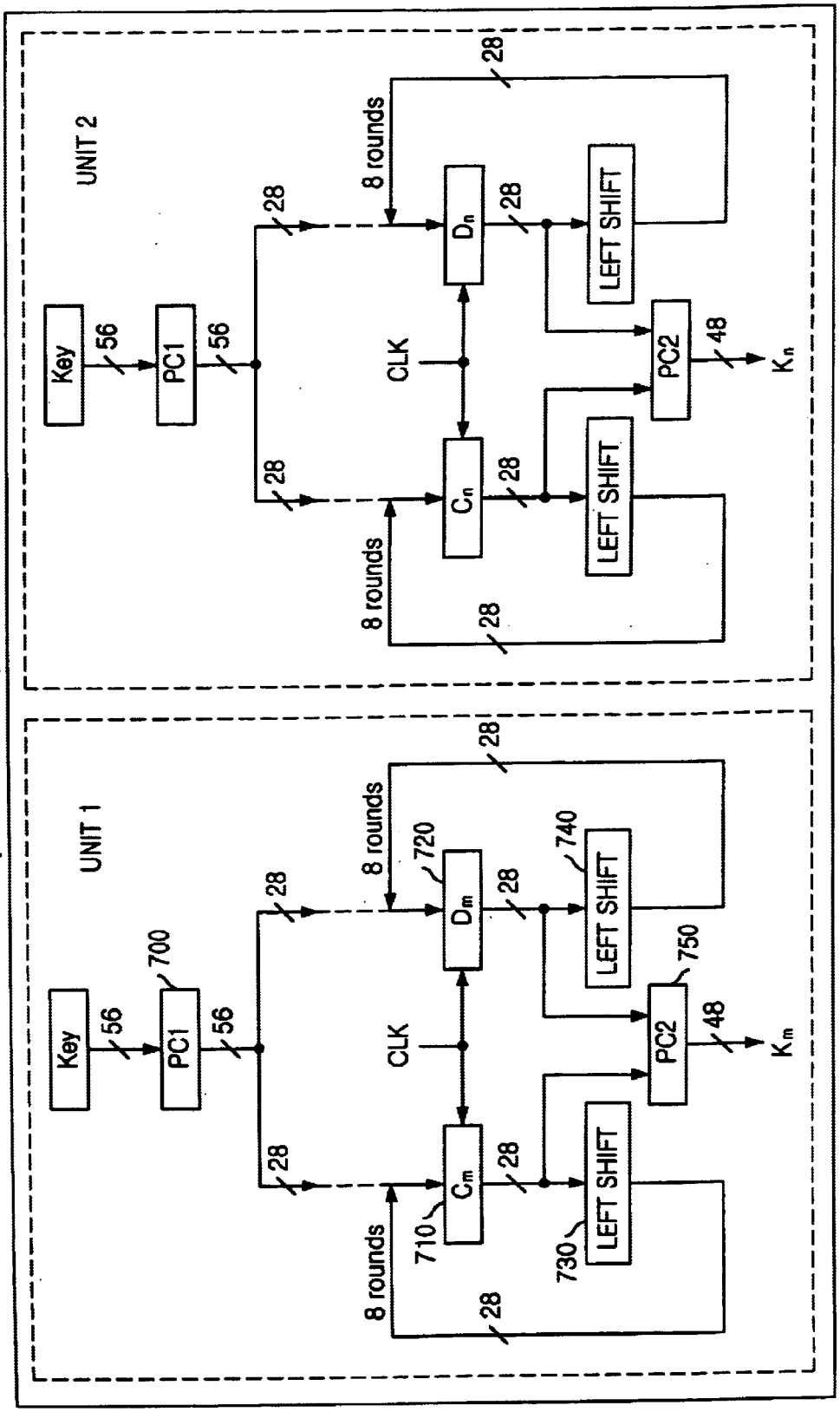
FIG. 7 is a block diagram of a conventional key scheduler having two key scheduling units.

The key scheduler of FIG. 9 computes a subkey $K_{2i}$ in i-th round by using the second key scheduling unit of FIG. 7. As shown in a table of FIG. 9, a relation between a total number $TS_m$ of shifted bits for obtaining a subkey $K_{2i-1}$ and a total number $TS_n$ of shifted bits for obtaining a subkey $K_{2i}$ in i-th round are expressed as: $TS_m - TS_n = D_n$.

In the first round ($P_0$) and the eighth round ($P_7$), a difference value $D_n$ is −1. In the other, rounds ($P_1$ to $P_6$), the difference value $D_n$ is −2. Using additional two right shifters 960 and 970 and the second permutation choice unit 980 implemented by wiring, the key scheduler computes the subkeys $K_{2i}$ and $K_{2i-1}$ in i-th round and outputs subkeys $K_n$ and $K_m$.

Figure 10:
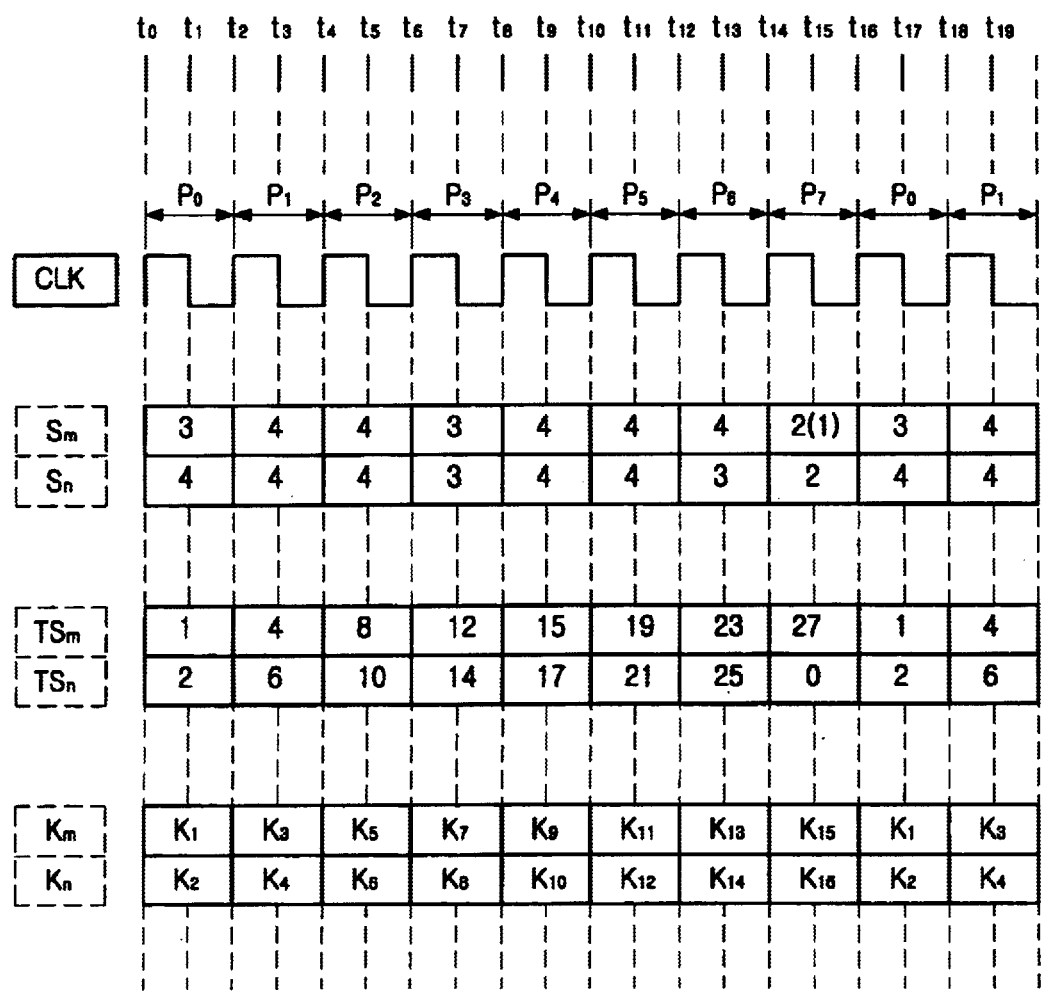
FIG. 10 is a timing diagram for explaining operations of the key scheduler of the present invention.

FIG. 10 is a timing diagram illustrating operations of the key scheduler.

Referring to FIG. 10, $K_m$ and $K_n$ denote access times to the subkeys in 8-round DES architecture. $TS_m$ and $TS_n$ denote a total number of shifted bits of the initial key block after the first permutation choice unit (PC1). $S_m$ and $S_n$ denote numbers of shifted bits in each round ($P_i$) in order to obtain the total numbers of shifted bits described in $TS_m$ and $TS_n$.

Processes for generating the subkey will be described.

In a first round ($P_0$), since $TS_m$ and $TS_n$ are 1 and 2, the subkeys $K_1$ and $K_2$ are generated by shifting the initial key block from the PC1 by one and two bits and permuting the shifted block through the PC2.

In a second round ($P_1$), since $TS_m$ and $TS_n$ are 4 and 6, in order to generate the subkeys $K_3$ and $K_4$, each of the shift units shifts the key block stored in the corresponding register to left by 3 (=4−1) and 4 (=6−2) bits.

In a third round ($P_2$), since $TS_m$ and $TS_n$ are 8 and 10, in order to generate the subkeys $K_5$ and $K_6$, each of the shift units shifts the key block stored in the corresponding register to left by 4 (=8−4) and 4 (=10−6) bits.

In each round ($P_i$), the key blocks stored in the corresponding registers are shifted to left by $S_m$ and $S_n$ bits, and the key blocks are shifted by $TS_m$=27 and $TS_n$=28($\approx$0) in an eighth round ($P_7$) Then, in order to return to the first round, i.e., $TS_m$=1 and $TS_n$=2, $S_m$ and $S_n$ should be two (2) respectively.

Generally, there are lots of data blocks to be encrypted with compared to a given key in many cases. At this time, performance of encryption can be increased by using a pipeline structure. Pipelines used in the DES architecture are classified as a micro pipeline and a macro pipeline in accordance with a level to which is applied.

A data input rate to the DES encryption unit is decided based on a speed of a whole encryption system rather than a speed of the DES encryption unit. In case of DES architecture used for networking, the period of the macro pipeline is decided in accordance with a maximum transmission rate of a modulator and a demodulator, and a speed of an external host microprocessor.

In general, a data input/output speed of the DES encryption unit is slow. Since the data is moved byte-by-byte (8 bits) in outside of the DES encryption unit and the DES encryption unit performs encryption of the 64-bit data block and outputs encrypted 64-bit data block, there are necessary an input register and an output register In order to reduce latency of input/output, the encryption apparatus of the present invention uses a macro pipeline including an input process (first stage), a DES operation process (second stage) and an output process (third stage). A period of the macro pipeline is determined by a maximum value among times for input, output and DES operation of the data. When the times for the input, the output and the DES operation of the data are identical, the macro pipeline structure has a maximum effect on reduction of the latency.

Figure 11:
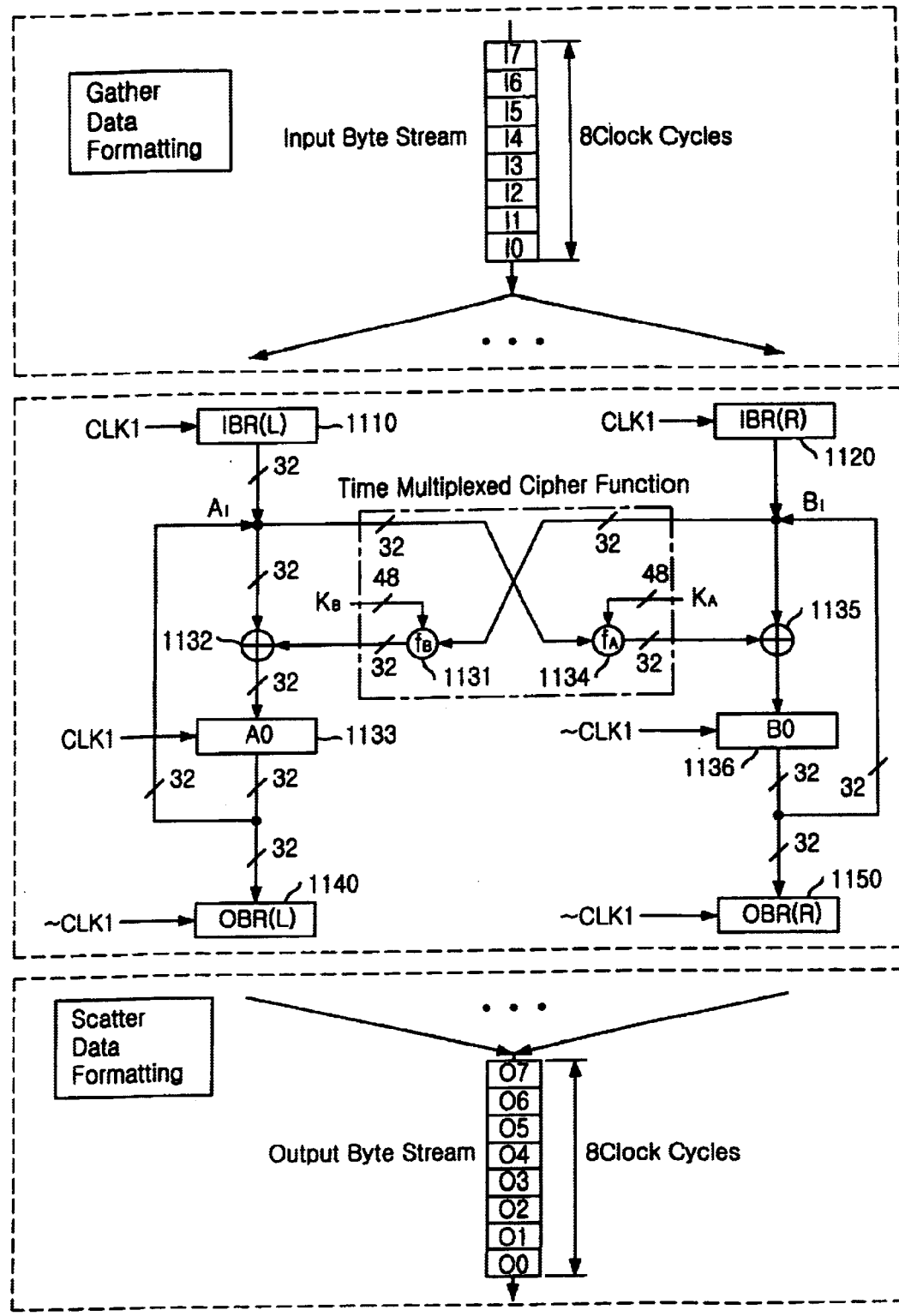
FIG. 11 is a block diagram of a DES architecture using a macro pipeline and a time multiplexed cipher function unit in accordance with the present invention.

FIG. 11 is a block diagram of a DES architecture using a macro pipeline and a time multiplexed cipher function unit to which the present invention is applied.

Referring to FIG. 11, the macro pipeline includes three stages. In a first stage, input data stream is divided into eight 8-bit blocks, every four 8-bit blocks are sequentially inputted, gathered and stored into a left input buffer register (IBR(L)) 1110 and a right input buffer register (IBR(R)) 1120. In a second stage, each 32-bit data block from the left and the right input buffer registers is alternatively inputted to a first and a second cipher function units and encrypted for 8 rounds. In a third stage, each 32-bit data block is divided into four 8-bit blocks and outputted by 8-bit block through a left output buffer register (OBR(L)) 1140 and a right output buffer register (OBR(R)) 1150.

The time multiplexed cipher function unit receives the 32-bit blocks from the registers A0 and B0 and subkeys $K_A$ and $K_B$ from the key scheduler. For a front half of the first clock, the cipher function unit $f_A$ is operated, for a latter half of the first clock, the cipher function $f_B$ is operated. In other words, the time multiplexed cipher function unit receives the 32-bit block from the register A0 and the subkey $K_A$, performs cipher function over the, register A0 and the subkey $K_A$ through the expansion permutation unit, the XOR unit, the S-Box permutation unit and, the P-Box permutation unit, and outputs the 32-bit block which is the cipher function operation result. Similarly, the time multiplexed cipher function unit receives the 32-bit block from the register B0 and the subkey $K_B$, and outputs the cipher function operation result.

The key scheduler or the present invention generating two subkeys $K_{2i-1}$ and $K_{2i}$ for one clock cycle can be used for the 8 round DES architecture using the time multiplexed cipher function unit.

Figure 12:
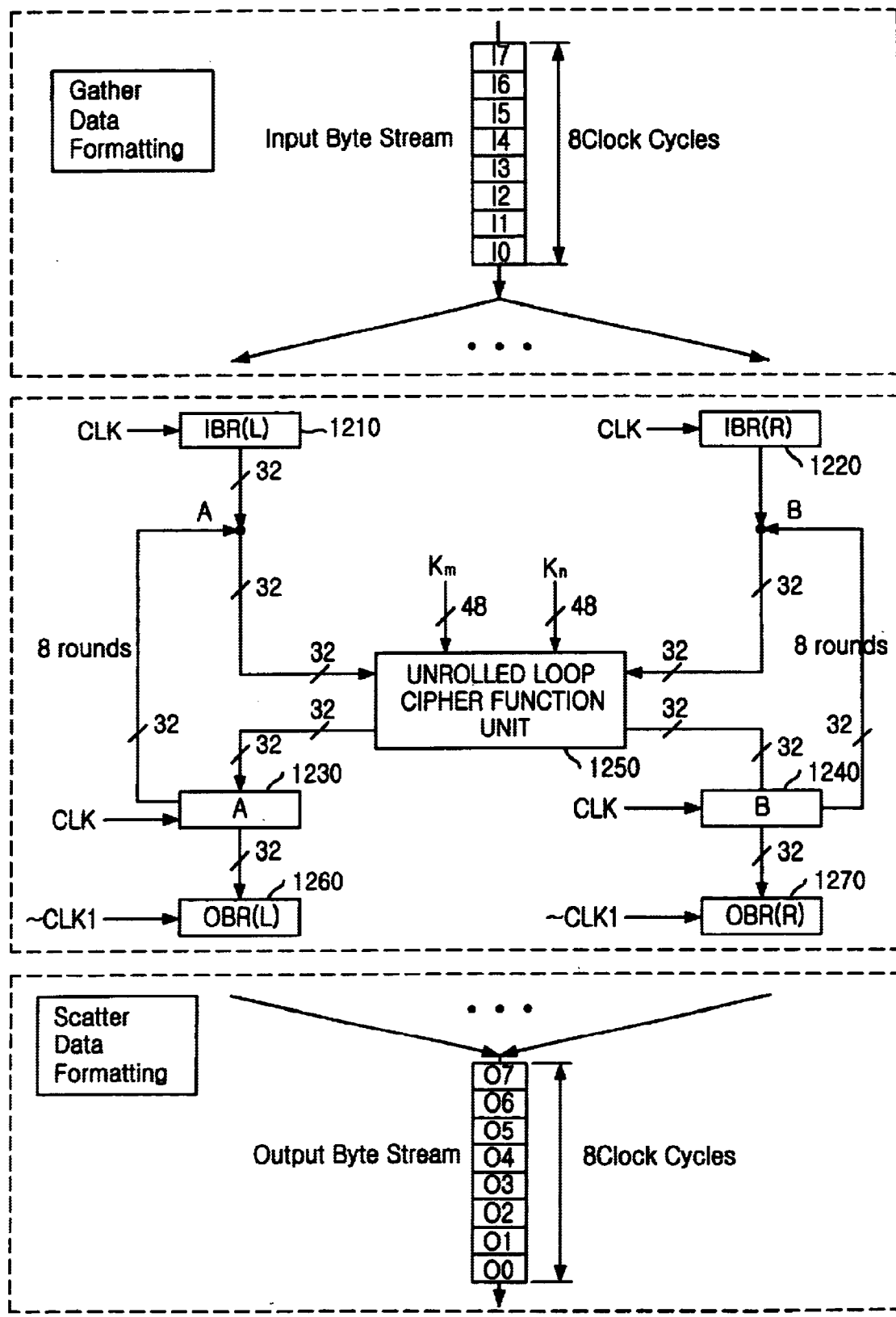
FIG. 12 is a block diagram of a DES architecture using a macro pipeline and an unrolled loop cipher function unit in accordance with the present invention.

FIG. 12 is a block diagram of a DES architecture using a macro pipeline and an unrolled loop cipher function unit to which the present invention is applied.

Referring to FIG. 12, the macro pipeline includes three stages. In a first stage, input data stream is divided into eight 8-bit blocks, every four 8-bit blocks are sequentially inputted, gathered and stored into a left input buffer register (IBR(L)) 1210 and a right input buffer register (IBR(R)) 1220. In a second stage, each 32-bit data block from the left and the right input buffer registers is encrypted by the unrolled loop cipher function unit for 8 rounds. In a third stage, each 32-bit data block is divided into four 8-bit blocks and outputted by 8-bit block through a left output buffer register (OBR(L)) 1260 and a right output buffer register (OBR(R)) 1270.

The key scheduler of the present invention generating two subkeys $K_{2i-1}$ and $K_{2i}$ (i=1, 2, . . . , 8) for one clock cycle can be used for the 8 round DES architecture using the time multiplexed cipher function unit and the unrolled loop cipher function unit.

The conventional key scheduler having two key scheduling units includes four registers storing shifted results of the initial key block, which take large area in a chip.

In i-th round, a total number of shifted bits of the initial key block for obtaining the subkeys $K_{2i-1}$ and $K_{2i}$ are one or two bit(s). The key schedulers of FIGS. 8 and 9 can be implemented by using one of the key scheduling units of FIG. 7. The key schedulers of FIGS. 8 and 9 compute another pairs of subkeys $K_{2i}$ and $K_{2i-1}$ from the key block used for obtaining the subkeys $K_{2i-1}$ and $K_{2i}$ by using additional two shifters and a permutation choice unit (PC2). Since the total number of the shifted bits does not become 0 (=28) in case of the key scheduler of FIG. 8 using the first key scheduling unit, an additional device is necessary when the initial key is stored. Therefore, size of the key scheduler of FIG. 8 is larger than that of the key scheduler of FIG. 9 using only the second key scheduling unit. Since the unrolled loop cipher function starts the cipher function operation by using the subkey $K_{2i-1}$, the key scheduler of FIG. 9 obtains the subkey $K_{2i-1}$ by using the right shifter, a number of threshold paths are larger than that of the key scheduler of FIG. 8.

Figure 13:
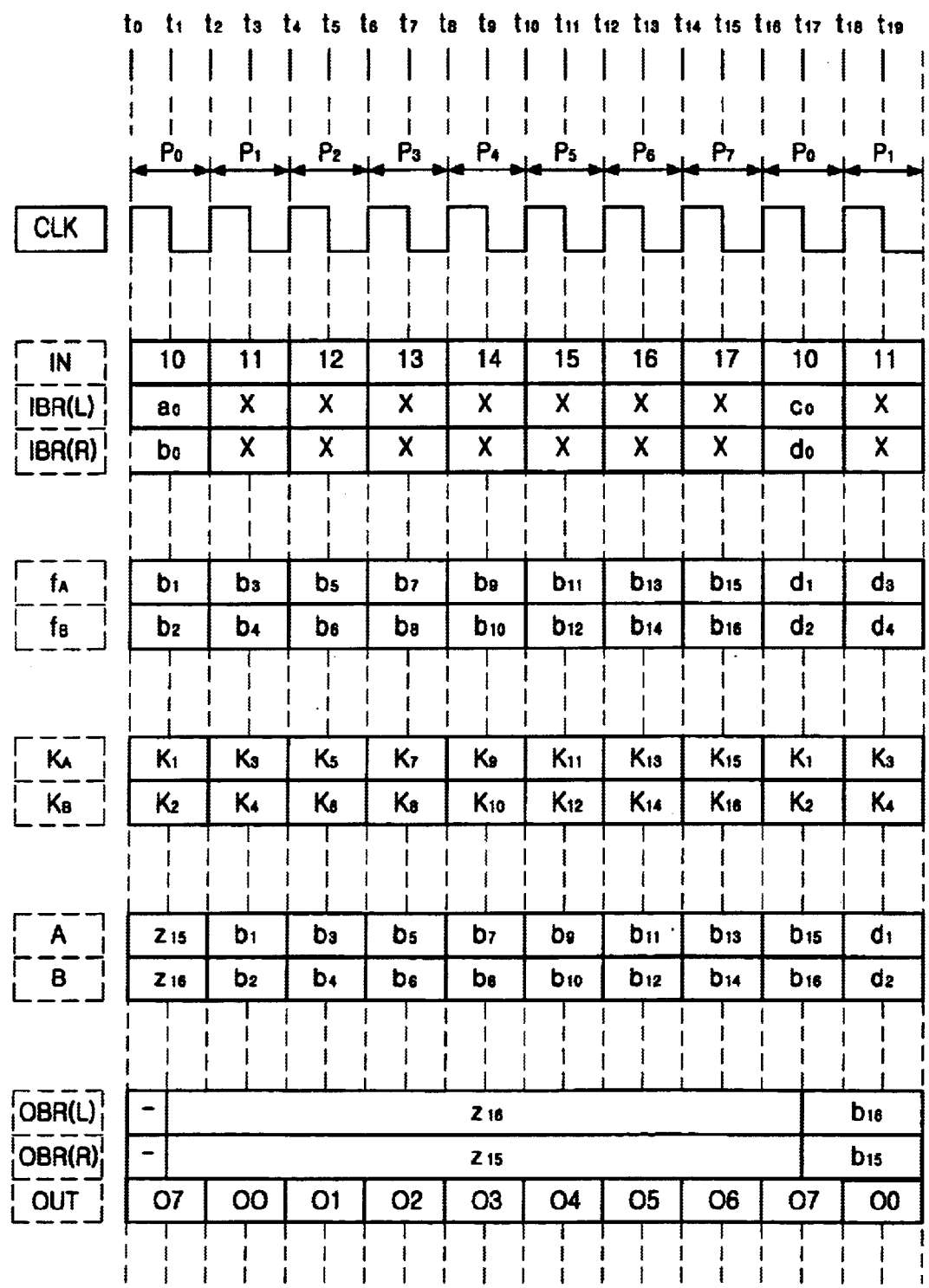
FIG. 13 is a timing diagram for explaining operations of DES architecture using a macro pipeline and an unrolled loop cipher function unit.

FIG. 13 is a timing diagram for explaining operations of DES architecture using a macro pipeline and an unrolled loop cipher function unit.

Referring to FIG. 13, the DES architecture receives initial permuted plain text $(y_0, z_0)$, $(a_0, b_0)$, $(c_0, d_0)$ in order and computes $z_i$, $b_i$, $d_i$ (i=1, 2, . . . , 16) and outputs $(z_{16}, z_{15})$, $(b_{16}, b_{15})$, $(d_{16}, d_{15})$.

For easy description, process of computing $b_i$ from $(a_0, b_0)$ and outputting $(b_{16}, b_{15})$ will be described. A 64-bit plain text block after initial permutation is divided into two 32-bit blocks $a_0$ and $b_0$. In other words, $a_0=L_0=R_{-1}$, and $b_0=R_0$. The DES encryption unit computes values $b_1, b_2, . . . , b_{16}$ ($b_i=R_i$). Before computing $b_i$, a subkey $K_i$ is provided to a cipher function unit from a key scheduler.

For eight cyclers before $t_0$ data which is inputted byte-by-byte is gathered in the input buffer register (IBR). The left buffer register (IBR(L)) remains $a_0$ and the right buffer register (IBR(R)) remains $b_0$ at $[t_0-t_2]$. At a next clock, each of the input buffer registers gathers one byte of a next plain text block $c_0$ and $d_0$. After eight clock cycles, the input buffer registers remain $c_0$ and $d_0$ at $[t_{16}-t_{18}]$.

The output buffer registers (OBR) load from $z_{16}$ and $z_{15}$ from A0 and B0 at $t_1$, and output inverse permuted data at $t_1$ byte-by-byte for 8 clock cycles. The data blocks of $z_{16}$ and $z_{15}$ are remained in the OBR, $b_{16}$ and $b_{15}$ from the registers A and B at $t_{17}$ are loaded and remained for eight clock cycles, and the inverse-initial-permuted data is outputted byte-by-byte from $t_{17}$.

$a_0$ and $b_0$ registered in the input buffer register (IBR) are accessed at $[t_0-t_2]$, the unrolled loop cipher function is computed at $[t_0-t_2]$ by using the subkeys $K_1$ and $K_2$ from the key scheduler, $b_1$ and $b_2$ can be stored in the registers A and B at $t_2$.

Since $b_1$ and $b_2$ registered in the A and B can be accessed at $[t_2-t_4]$, the unrolled loop cipher function is computed at

[$t_2$–$t_4$] by using the subkey $K_3$ and $K_4$ from the key scheduler, $b_3$ and $b_4$ can be stored in the registers A and B at $t_4$.

Computation of $b_1$ and $b_2$ is started at $t_0$, and then, each of $b_2, b_3, \ldots b_{15}$ is computed and stored at the corresponding register. After eight clock cycles, $b_{15}$ and $b_{16}$ are stored in the registers A and B at $t_{16}$, thereby terminating DES operation of $a_0$ and $b_0$. Simultaneously, DES operation of $c_0$ and $d_0$ is performed $t_{16}$.

FIG. 14 is a timing diagram illustrating effect of the DES architecture using a macro pipeline in accordance with the present invention.

Referring to FIG. 14, it shows comparison result of performances of the 8-round pipeline DES architecture and the 16-round DES architecture. Latency means a number of clock cycles which are necessary from input of one plain text block to output of one cipher text block through the DES encryption operation. Throughput means a number of the plain text blocks encrypted for a clock cycle.

In case of the conventional 16-round DES architecture using no macro pipeline, since the input process and the output process take 8 clock cycles respectively and the DES encryption process takes 16 clock cycles, a new plain text block can be inputted at every 32 clock cycles. In this case, the latency is 32 and the throughput is 1/32.

If 2-stage macro pipeline is introduced in the input and the output processes, the latency is 32 which is the same as that of the case as mentioned above, however, the input process and the output process of the encrypted data are simultaneously performed. Therefore, a new plain text block can be inputted at every 24 clock cycles, and the throughput is 1/24.

If 3-stage macro pipeline is introduced in the input process, the DES encryption process and the output process, since eight clock cycles are idle in the input and the output processes respectively, the latency is 40 which is larger than that of the case as mentioned above, however, the throughput is 1/16. In other words, a new plain text block can be inputted and encrypted at every 16 clock cycles. The DES architectures using the unrolled loop cipher function unit and the time multiplexed cipher function unit performs the input process, the DES encryption process and the output process for 8 clock cycles. If 3-stage macro pipeline is introduced to the DES architectures using the unrolled loop cipher function unit and the time multiplexed cipher function unit, the latency is 24, the throughput is 1/8, and a new plain text block can be inputted and encrypted at every 8 clock cycles.

Using the key scheduler having one key scheduling unit, the encryption apparatus has a small size, thereby reducing a cost of the encryption apparatus.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A key scheduler for an apparatus using DES encryption algorithm, comprising:

a first permutation choice unit for permuting a 56-bit block;

a first register for storing left 28 bits among the 56-bit block from the first permutation choice unit in accordance with a clock signal;

a second register for storing right 28 bits among the 56-bit block from the first permutation choice unit in accordance with the clock signal;

a first and a second shift units for shifting the 28-bit blocks stored in the first and the second registers to the left by a first predetermined number of bits and outputting shifted 28-bit blocks to the first and the second registers respectively;

a second permutation choice unit for permuting the 28 bits stored in the first and the second registers, thereby generating a first subkey;

a third and fourth shift units, each for shifting the 28 bits stored in the first and the second registers to left by a second predetermined number of bits; and a third permutation choice unit for permuting the 28 bits stored in the third and the fourth shifters, thereby generating a second subkey.

2. The key scheduler as recited in claim 1, wherein the second predetermined number is one or two.

3. The key scheduler as recited in claim 2, wherein third permutation choice unit is implemented by wiring.

4. A key scheduler for an apparatus using DES encryption algorithm, comprising:

a first permutation choice unit for permuting a 56-bit block;

a first register for storing left 28 bats among the 56bit block from the first permutation choice unit in accordance with a clock signal;

a second register for storing right 28 bits among the 56-bit block from the first permutation choice unit in accordance with the clock signal;

a first and a second shift units for shifting the 28-bit blocks stored in the first and the second registers to the left by a first predetermined number of bits and outputting shifted 28-bit blocks to the first and the second registers respectively;

second permutation choice unit for permuting the 28 bits stored in the first and the second registers, thereby generating a first subkey;

a third and a fourth shift units, each for shifting the 28 bits stored in the first and the second registers to right by a second predetermined number of bits,; and a third permutation choice unit for permuting the 28 bits stored in the third and the fourth shifters, thereby generating a second subkey.

5. The key scheduler as recited in claim 4, wherein the second predetermined number is one or two.

6. The key scheduler as recited in claim 5, wherein the third permutation choice unit is implemented by wiring.

* * * * *